United States Patent [19]
Gilbert

[11] Patent Number: 5,365,568
[45] Date of Patent: Nov. 15, 1994

[54] SMOKE DETECTOR WITH AUTOMATIC DIALING

[76] Inventor: Raymond Gilbert, 3458 Clérin, Ste-Foy, Québec, Canada, G1X

[21] Appl. No.: 86,119

[22] Filed: Jul. 6, 1993

Related U.S. Application Data

[63] Continuation-in-part of Ser. No. 787,095, Nov. 4, 1991, abandoned.

[51] Int. Cl.$^5$ .......................................... H04M 11/04
[52] U.S. Cl. ...................................... 379/43; 379/42; 379/44; 379/47
[58] Field of Search ................. 379/37, 39, 40, 41, 379/42, 43, 44, 47, 49, 51; 340/506

[56] References Cited

U.S. PATENT DOCUMENTS 3,505,476 4/1970 Kelly, Jr. et al. ................. 379/37
5,164,979 11/1992 Choi ..................................... 379/40

FOREIGN PATENT DOCUMENTS

8903627 4/1989 WIPO ................................. 379/39

Primary Examiner—Curtis Kuntz
Assistant Examiner—Jason Chan
Attorney, Agent, or Firm—Pierre Lespérance; Francois Martineau

[57] ABSTRACT

One or more of a plurality of alarm conditions can be detected by respective alarm detectors. The detected alarm conditions can be reported to one or more respective monitoring stations. The system includes circuitry for controlling the consumption of power.

6 Claims, 12 Drawing Sheets

SMOKE DETECTOR WITH AUTOMATIC DIALING

This Application is a continuation-in-part Application of U.S. Pat. application Ser. No. 07/787,095, filed Nov. 4, 1991, now abandoned.

BACKGROUND OF INVENTION

1. Field of the Invention

The invention relates to an apparatus for detecting fire and other alarm conditions and transmitting a corresponding emergency signal to a remote central monitoring station. More specifically, the invention relates to such apparatus which includes battery conserving means.

2. Description of Prior Art

Various emergency reporting or alarm systems exist for installation in houses and other buildings, which link up the alarm system to a central monitoring station which in turn, can take steps for notifying the police or the fire department or a medical organization. Known such systems are quite costly and they often require a special dedicated telephone line. They are also very demanding on the batteries powering them in that the systems have to be powered up so that they can detect alarm conditions.

Generally speaking such a known alarm system comprises a central unit and a series of detectors such as infra-red sensors which mainly serve to detect a non-desired presence. These known systems must be armed when the house occupant leaves the premises and must be disarmed when the occupant comes back to the house. This requirement is constraining with the result that the occupant often abandons or forgets the arming and disarming procedure.

Also the house occupant, in an emergency and therefore stressful situation, must use a conventional telephone apparatus to communicate with the attendant at the central monitoring station. Both the attendant and the occupant may dial at the same time and the communication becomes impossible. Frequently, the attendant, in an intrusion situation, is under directives not to call the occupant. In such a situation, the occupant must call the attendant and frequently he does not have the required central telephone number at hand, so much so that the is in a stressful situation. Delays therefore occur which are highly harmful in an emergency situation.

OBJECTS OF THE INVENTION

The general object of the invention is to provide a conventional casing for a smoke detector which encloses not only a smoke detecting circuit but also is circuited for automatic telephonic communication with his central monitoring station, and yet is powered in an autonomous manner by a standard dry cell battery as used in conventional smoke detectors.

Another object of the present invention is to provide an emergency system of the character described having means for sending another type of emergency alarm or signal, than a fire or smoke signal.

Another object of the present invention is to provide an intrusion system of the character described. Having an electronic key to arm and disarm the intrusion system without need to know and remember a code to be punched on a keypad.

Another object of the present invention is to provide a device of the character described provided with means for establishing bi-directional voice communication between the occupant of the monitored area and the attendant at the central monitoring station.

Another object of the present invention is that all the communications are transmitted over a conventional public utility phone line.

Another object of the present invention is to provide an apparatus which includes battery conserving means.

SUMMARY OF THE INVENTION

The alarm system of the invention comprises a small portable casing adapted to be secured to a ceiling, a wall or the like, in a from to be monitored, said casing enclosing it sown power supply, a smoke sensing device and its attendant electronic circuit together with a microprocessor and automatic telephone dialer and a modem with telephonic cord connectors. The circuit is capable of using the public utility phone lines to automatically dial upon a smoke detection, so as to communicate with a computer at said monitoring station.

Preferably, the casing includes a discriminating circuit to permit signals indicating other types of emergency situations than a fire or smoke situation to be sent to the central monitoring station.

Preferably, the device further includes a high sensitivity microphone and a loud speaker together with a corresponding bidirectional voice communication circuit whereby through the same telephone line, voice communication can be established between the attendant at the central monitoring station and the occupant of the monitored area. The latter does not have to use the conventional telephone apparatus, the casing then being used as a free-hand telephone apparatus.

Preferably, this voice communication circuit enables the attendant at the monitoring station to control the directions of the voice communication in order to better manage a panic situation at the monitored area.

In accordance with a particular embodiment of the invention there is provided a system for detecting one or more of a plurality of alarm conditions, by respective alarm detectors, and for reporting the detected alarm conditions to one or more respective monitoring stations, comprising:
  an alarm detector receiving means being connected to said alarm detector;
  power consuming elements in said system;
  a power supply comprising a battery;
  power supply control means for connecting said battery to said power consuming elements under predetermined conditions and for disconnecting said battery from said power consuming elements under other conditions;
  wherein, said power supply is connected to said power consuming elements when an alarm condition is detected.

BRIEF DESCRIPTION OF DRAWINGS

The invention will be better understood by an examination of the following description, together with the accompanying drawings, in which.

DESCRIPTION OF PREFERRED EMBODIMENTS

The alarm system of the invention comprises a casing 2 of the size of a conventional smoke detector casing such as found in residential homes and adapted to be secured to the ceiling or a wall of the room to be monitored. Casing 2 comprises a box 4 to which is hinged a cover 6 by means of releasable hinges 8. The casing is secured to the ceiling by means of screws or the like inserted through holes in the tubular ears 10. The cover is maintained in closed position by a snap lock 12. Two female telephone jacks are mounted within the box 4 and opens at the side of the box 4, namely, an eight-pin telephone jack 14 to be connected to a telephone lines and a six-pin telephone jack 16 serving as an input for accessories. The box 4 also carries a push-button 18 which serves as a cancel/test button. The box 4 and cover 6 houses electronic circuits at two levels, namely the bottom level 20 and the top level 22.

Figure 1:
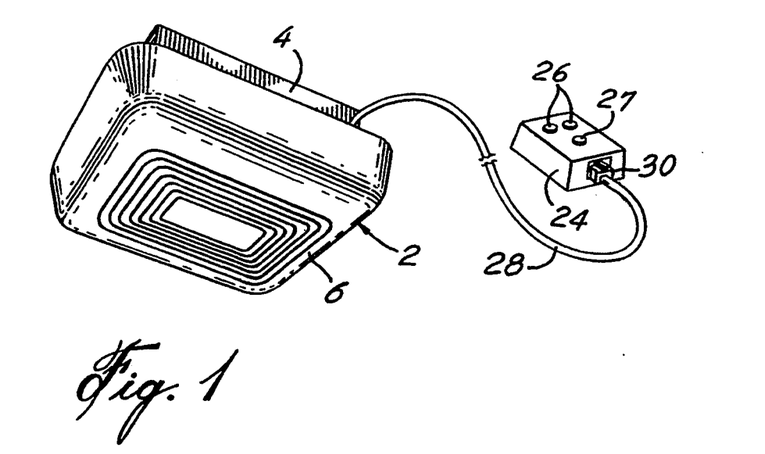
FIG. 1 is a perspective view of the smoke detector in accordance with the invention together with a control pad connected thereto.
Figure 2:
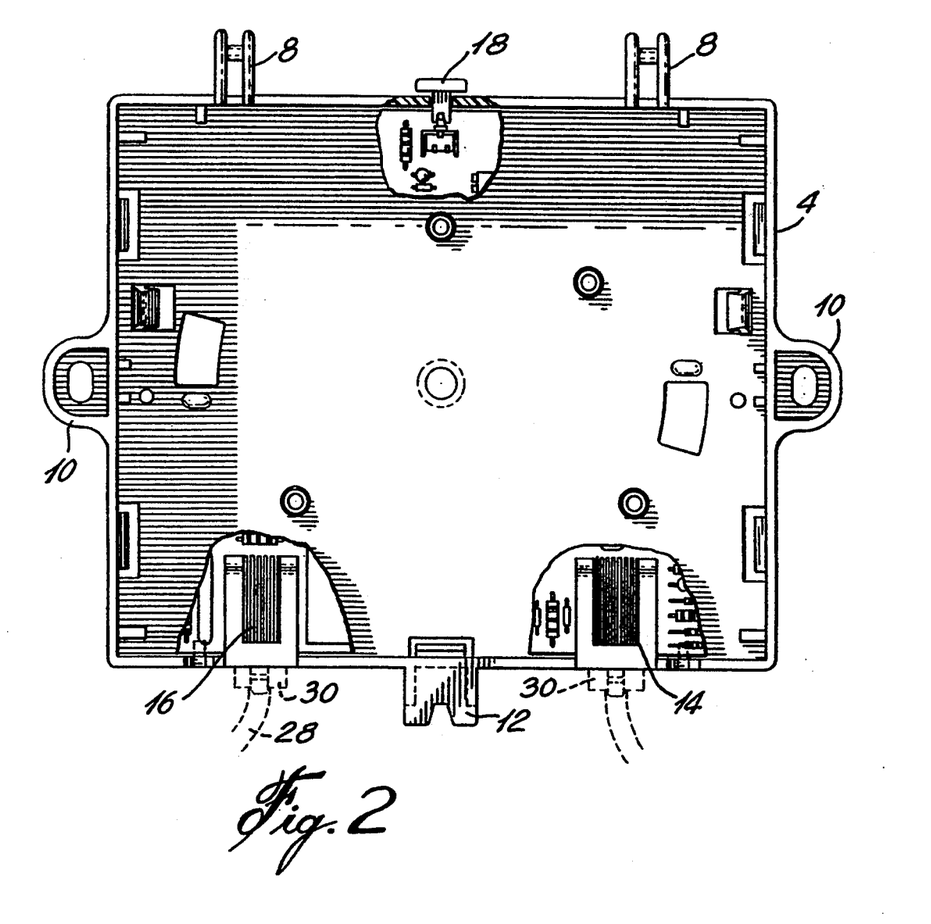
FIG. 2 is a bottom plan view of the casing of FIG. 1 and with portions of the bottom cut away to show certain parts located within the casing.
Figure 3:
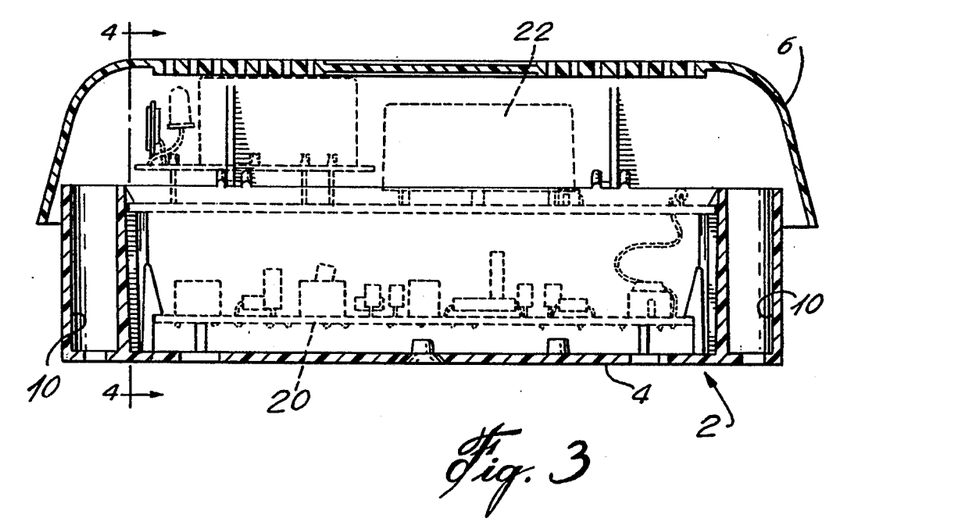
FIG. 3 is a vertical section of the casing.
Figure 4:
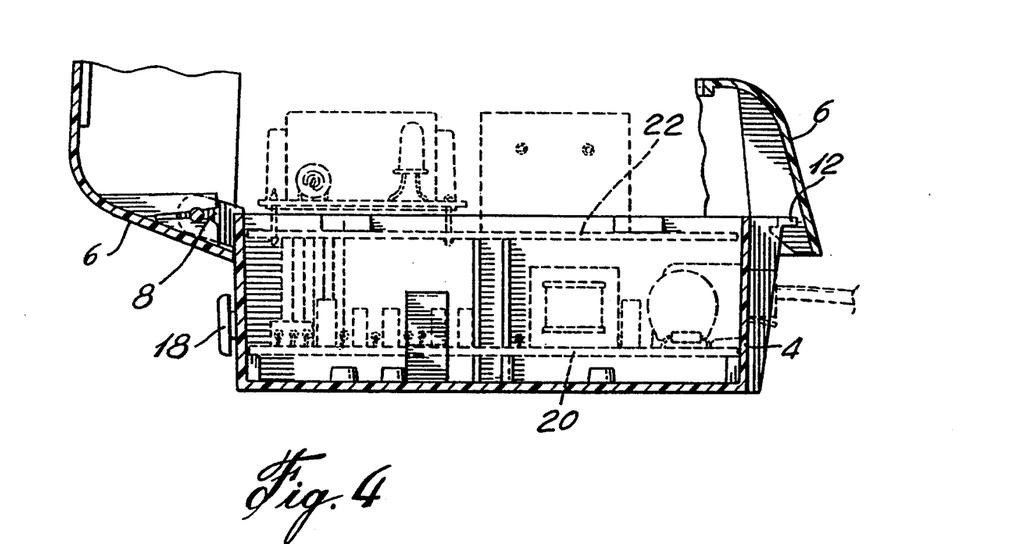
FIG. 4 is a cross-section taken along line 4—4 of FIG. 3.

As one type of input accessory, a remote control pad 24 is provided, having two top push-buttons 26 which serve, when simultaneously depressed, to manually sound an alarm and generate an emergency call and a single button 27 which serves to cancel the smoke alarm.

The pad 24 is connected to the input jack 1 through a conventional telephone cord 28 having at its ends two male plugs 30. The remote control pad 24 can be positioned in any easily accessible location within the room being monitored.

Figure 5:
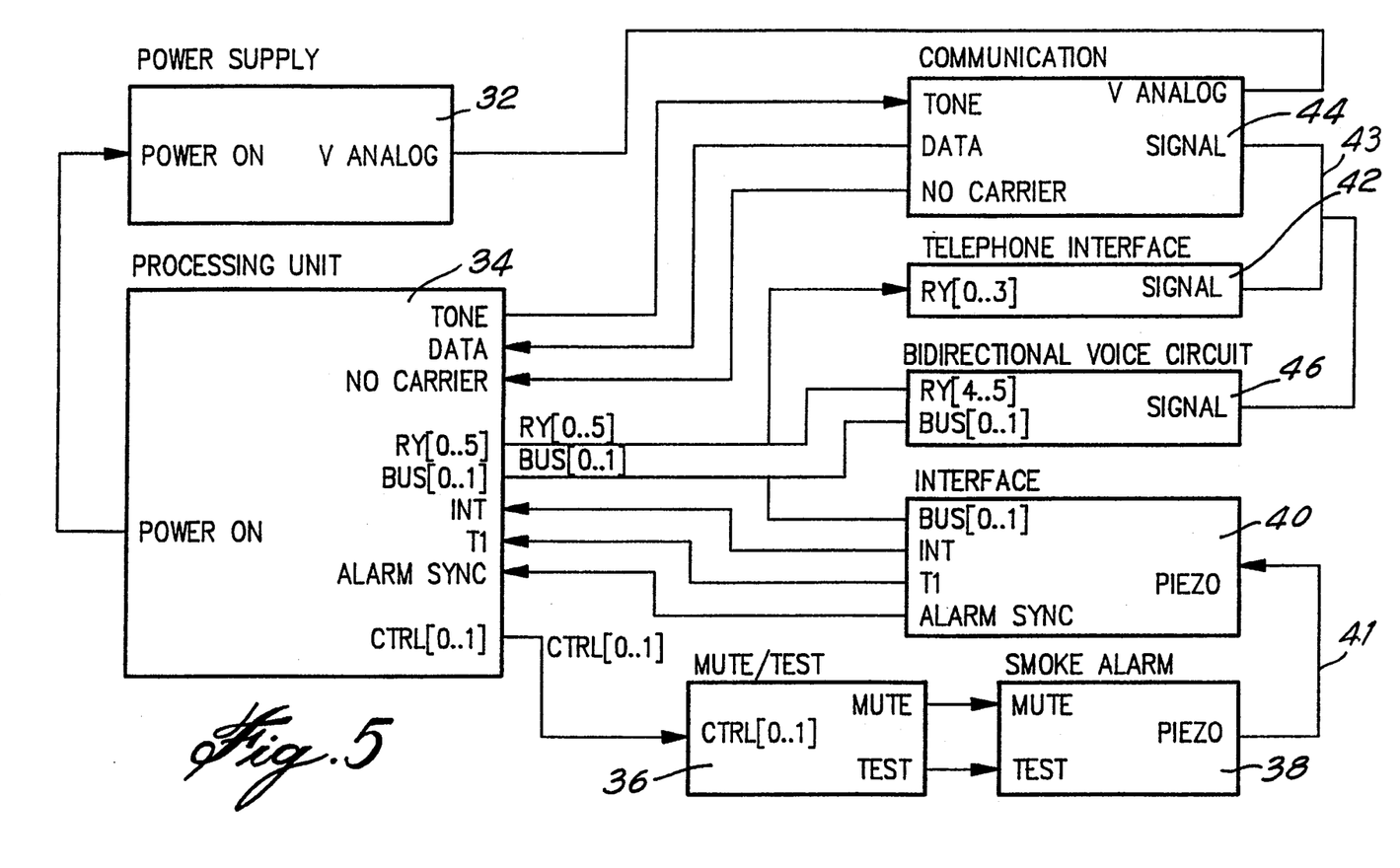
FIG. 5 is a schematic diagram of the electronic circuit contained in the casing of FIGS. 1 to 4.

The electric and electronic components contained in the casing 2 are shown in FIG. 5, as schematic blocks: a power supply 32 is provided which includes means to releasably receive a standard 9 volt alkaline battery such as found in conventional smoke detectors and which also includes the electronic circuit for furnishing different voltages as necessary to the various other electronic components.

A processing unit or micro-processor 34 is provided which controls all the operations and gives the necessary instructions.

A mute/test 36 is provided which is operated by the cancel/test button 18 or by the remote cancel button 27 on the remote control pad 24. If the apparatus is not in an alarm state when cancel/test button 18 is activated, then block 36 will effect a verification of the functioning of the apparatus. If the apparatus is in a smoke alarm state when button 18 is depressed, then the alarm is muted for a period of 30 seconds. After that the alarm resets itself. This occurs also when button 27 is depressed on the remote control pad 24. A smoke alarm block 38 is provided which contains a smoke detector preferably a double high ionization chamber and an audible alarm and attending electronic circuit.

An interface block 40 is provided which serves to detect a change of status of the different inputs: for instance this interface block, will detect whether the smoke detector is in a detection state or whether the two push-buttons 26 have been depressed simultaneously to sound an alarm, or if the button 27 is depressed to cancel the alarm. This interface block 40 can be also provided with electronic circuits not only to discriminate between a smoke-sensing signal for the smoke detector and between an emergency alarm from the control pad 24 but also to discriminate for instance the signals of intrusion detectors which would be connected to the input jack 16. A specific signal is therefore sent to the processing unit 34 accordingly.

A telephonic interface 42 is also present which comprises an automatic dialer and modem. A communication block 44 serves to coordinate the transmission of information between box 2 and a central control station through the telephonic lines.

Finally, casing 2 also preferably contains a high sensitivity microphone and a loud speaker, which may be combined as one unit, together with the attendant electronic circuits as denoted by bi-directional voice circuit 46. Line 43 connected to telephone interface block 42 indicates that he latter is connected to the female telephone jack 14 while line 41 connected to the interface block 40 indicates that the latter is connected to jack 18 and to remote control pad 24, namely for connection to various types of input accessories.

Figure 6:
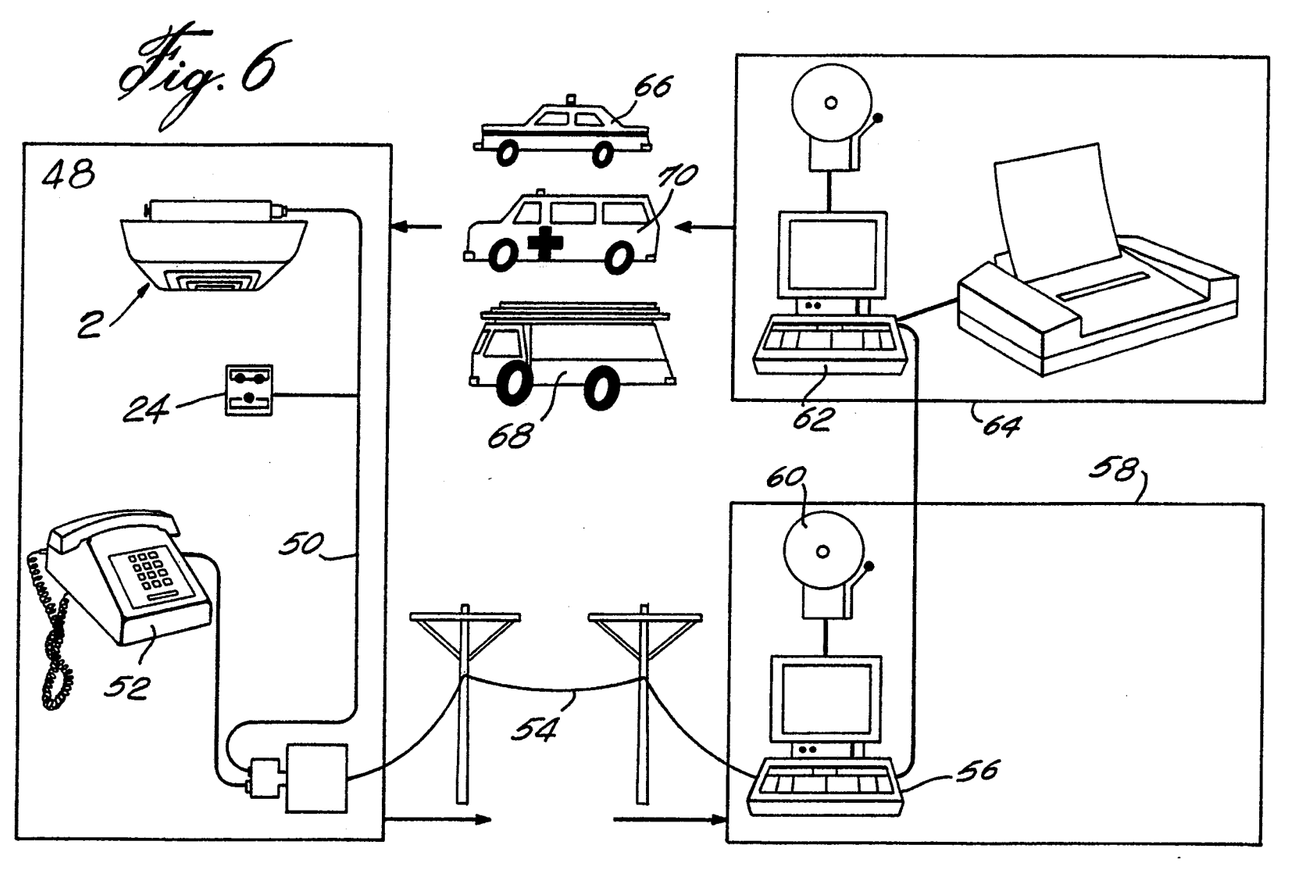
FIG. 6 is a schematic view showing the alarm system of the invention connected to a central monitoring station which is in turn connected to a public utility security service station.

Referring to FIG. 6, casing together with control pad 24 are shown located in a room 48 to be monitored. A telephone cord 50 is connected to the six-pin jack 14 and together with a conventional telephone apparatus 52 is connected to the utility telephone line 54 which fees the signal coming from the casing 2 to a computer 56 in a central monitoring station 58. The information is sent over liens 54 via the modem of telephonic interface 42, so as to obtain better sending accuracy of the transmitted signal. The signal, when received at computer 56, activates the audible alarm 60 to warn the attendant at the monitoring station. Upon a signal having been received by the computer 56, an order is sent to pull out from the hard disk of said computer, a customer file corresponding to the occupant of the room 48. The customer file may contain the following information: name and address of room occupant, information on the same such as whether he is an elderly or a sick person, key person to call in the case of emergency with phone number and any other useful information. The monitoring station attendant then sends relevant information to the computer 62 of the public security service station 64, the attendant of which sends the appropriate instructions in accordance with the type of emergency situation either to the police department, the fire department or the appropriate medical organization which sends the appropriate help as indicated by the police car 66, the fire fighting truck 68 and the ambulance 70.

Signals sent from casing 2 should have an override command mode that will interrupt and cancel a possible telephone conversation using the telephone 52.

Whenever the system does not include an oral communication facility with in the box 2 as provided by the bi-directional voice circuit 46, the room occupant will use the conventional telephone 52 to communicate with the attendant at central monitoring station 58. If the bi-directional voice circuit and microphone loud speaker unit is present in box 2, then the occupant can communicate directly with the attendant at the central monitoring station 58 without using telephone 52.

Voice circuit 46 includes circuitry which enables the attendant at the monitoring station to control the direction of the voice communication. The attendant decides whether to listen only or to speak only. He can thus better manage a panic situation at the monitored area.

Figure 7:
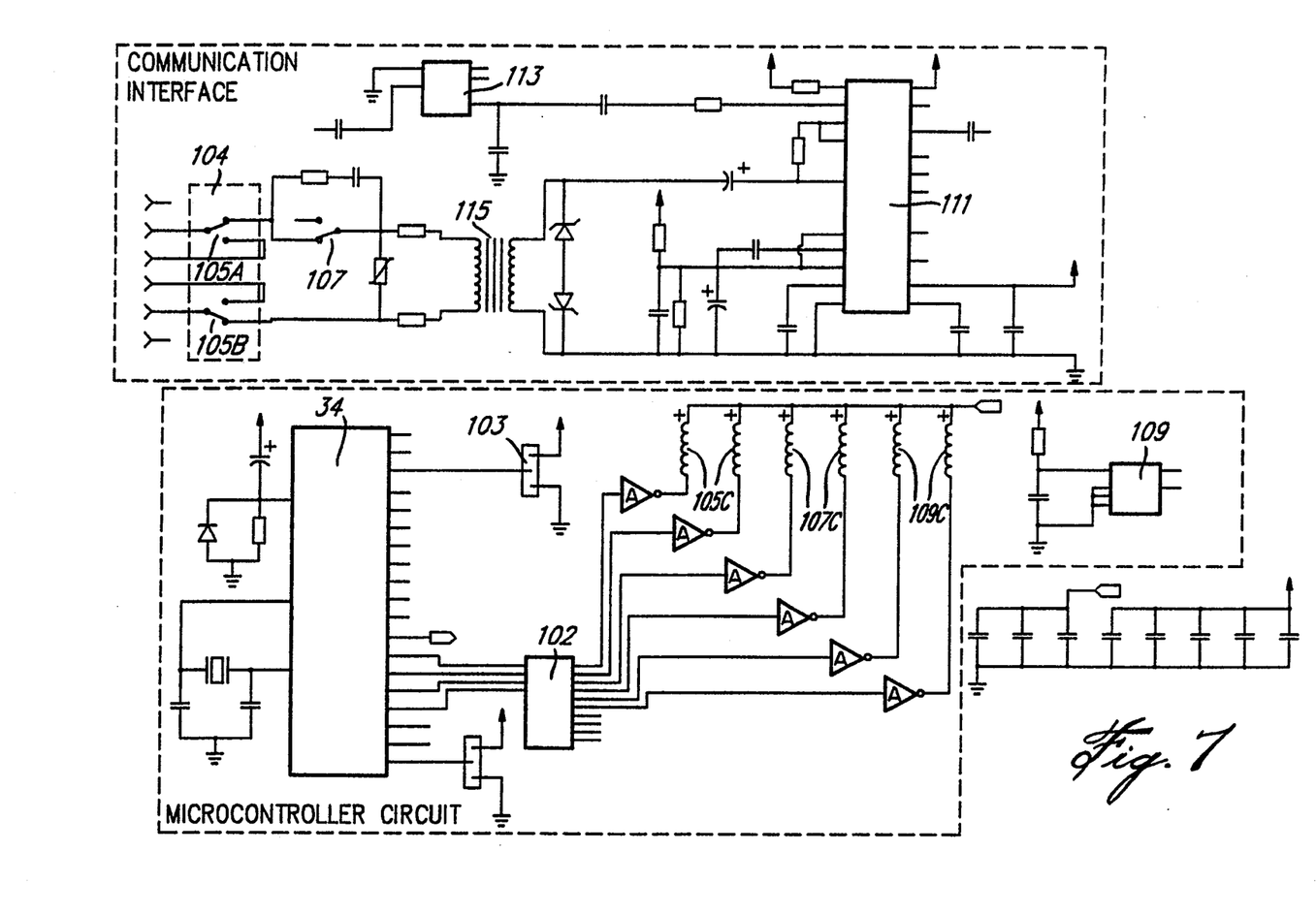
FIGS. 7 and 8 are circuit diagrams illustrating in more detail the inventive apparatus.
Figure 8:
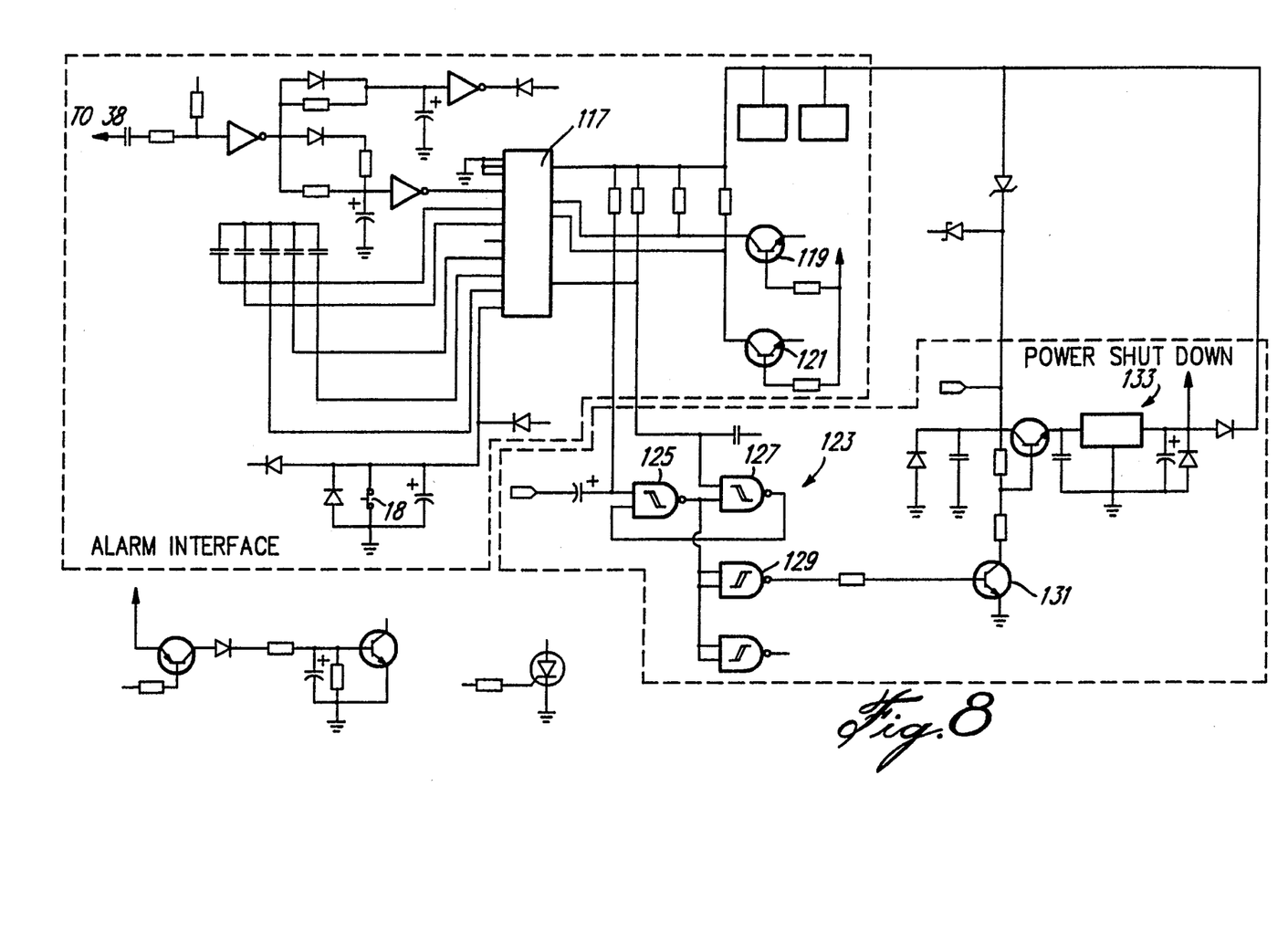

Referring now to FIGS. 7 and 8, the microprocessor 34 has four outputs, P3.1 to P3.4, connected to a selector chip 101. The selector chip 101 comprises a signetics 4028 which receives four inputs and, on the basis of the state of these inputs, provides an output signal on one of the ten outputs of the chip. Only six outputs are used in the present application, and these outputs are connected, through amplifiers A, to relay coils 105C of relay 104. The coils 105C activate the contact 105 of relay 104, and the contact 107 of relay 104. The contacts are physically held in the last position to which they are moved rather than being held there by a magnetic field of the coil as the latter would require a good deal more power.

Coils 109C drive the contact 109.

The output of the processor 34 is also fed to a jack 103. The jack 103 will be set to one position if the system is communicating with a touch-tone phone, and to another position if the system is communicating with a pulse phone.

The apparatus also includes a modem 111 which may comprise a semiconductor chip made by National Semiconductor and identified as the 74HC943. One input to the modem 111 is fed by a tone generator 113 which may comprise a signetics 312 chip. Outputs from the modem 111 are fed to the primary of transformer 115 whose secondary is connected to a telephone line through relay 109 and relay 104.

Turning to FIG. 8, the circuit further includes an alarm sensor input 117 which may comprise a signetics chip identified by the numeral 8514. Chip 117 includes output terminals SDA and SCL. The SDA terminal, and the lines connected thereto, carry data while the SCL terminal, and the lines connected thereto, carry clock inputs.

The SDA and SCL terminals of 117 are connected to the SDA and SCL terminals of 113 and the SDA and SCL terminals of 34 in FIG. 7. These terminals are also connected, respectively, to transistors 119 and 121. The transistors 119 and 121 comprise isolation means for isolating the terminals SDA and SCL of 117 from like terminals in other chips.

A further output of 117 is connected to trigger circuit 123 comprising gates 125 and 127. Each gate 125 and 127 comprises a quarter of a 4093 chip. The gate 129 comprises a third quarter of this same chip and is connected to transistor 131.

A power shut-down circuit is generally indicated at 133.

Figure 9A:
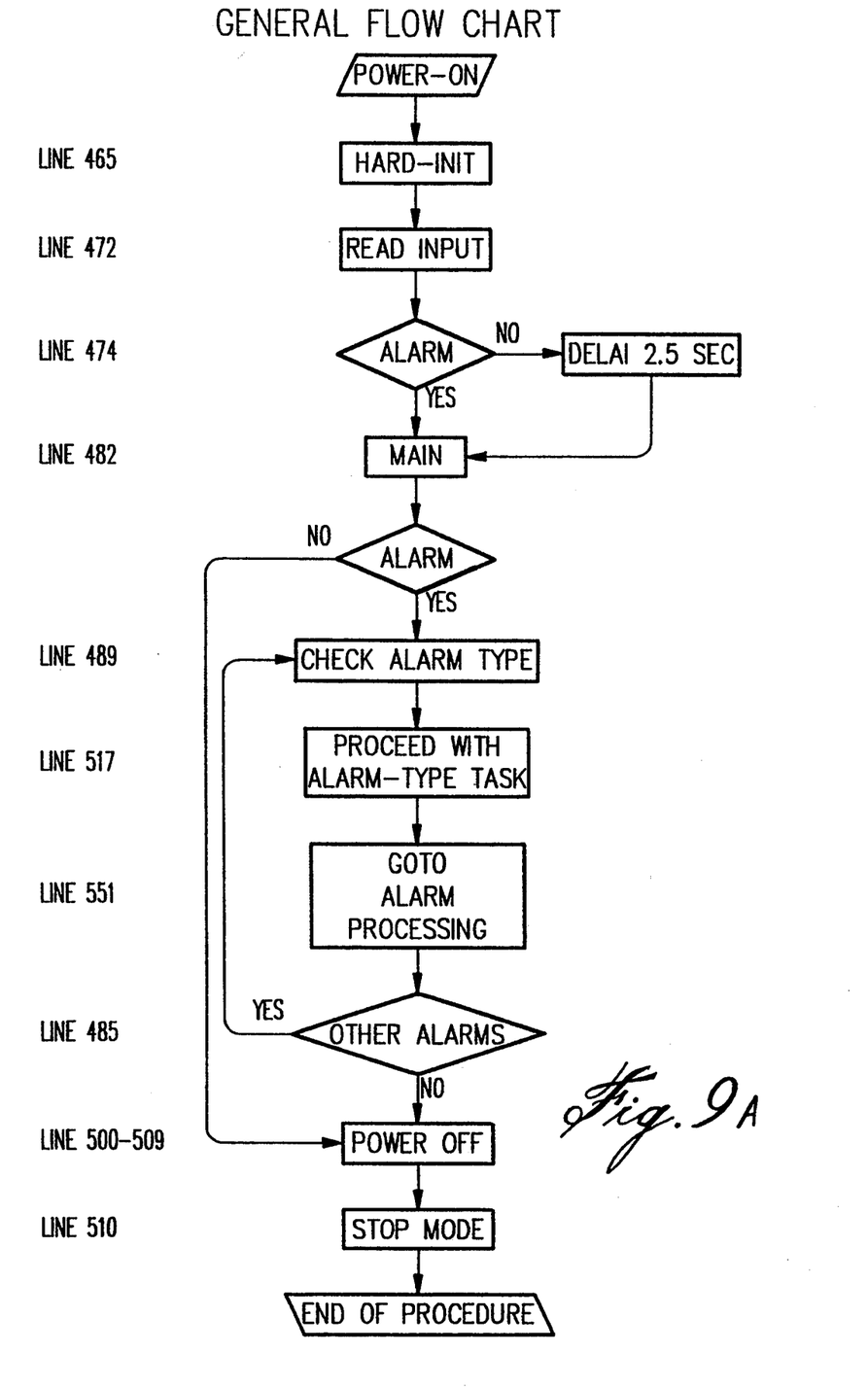
FIGS. 9A to 9F are flow charts of the software programs for driving the processor of the inventive system.

To understand the operation of this circuit, reference is had to FIGS. 7, 8 and 9A to 9F. Turning to FIG. 9A, this illustrates a general flow chart. The first time power is turned on, there is a hardware initializing step at line 465 and a false read at line 472 to determine the status of the interrupts. The interrupts are fed to the terminals 1, 2, 3, 4 . . . 7 of unit 117. These lines are connected to alarm sensors. Terminal 7 of 117 is connected to switch 18 as seen in FIG. 8.

When the program enters into the main flow at line 482, and the inputs are once again read to determine if there is an alarm signal. If there is no alarm signal, then the program jumps to the power off step at lines 500 to 509 which, as will be later seen, turns the power off the ICs and other power consuming elements so that power is saved. The program then enters the stop mode at line 510. It will then cycle back from the stop mode to the main at line 482 when the next event takes place. The next event could be either pressing the emergency button 18 or the test button or the detection of an actual alarm condition. When an alarm condition is detected, then the alarm decision box, between lines 482 and 489, will follow the YES arrow and the program will then check the alarm type. The alarm type task is then proceeded with and the program then enters the GO TO alarm processing. The flow chart for the alarm processing is illustrated in FIG. 9B.

Figure 9B:
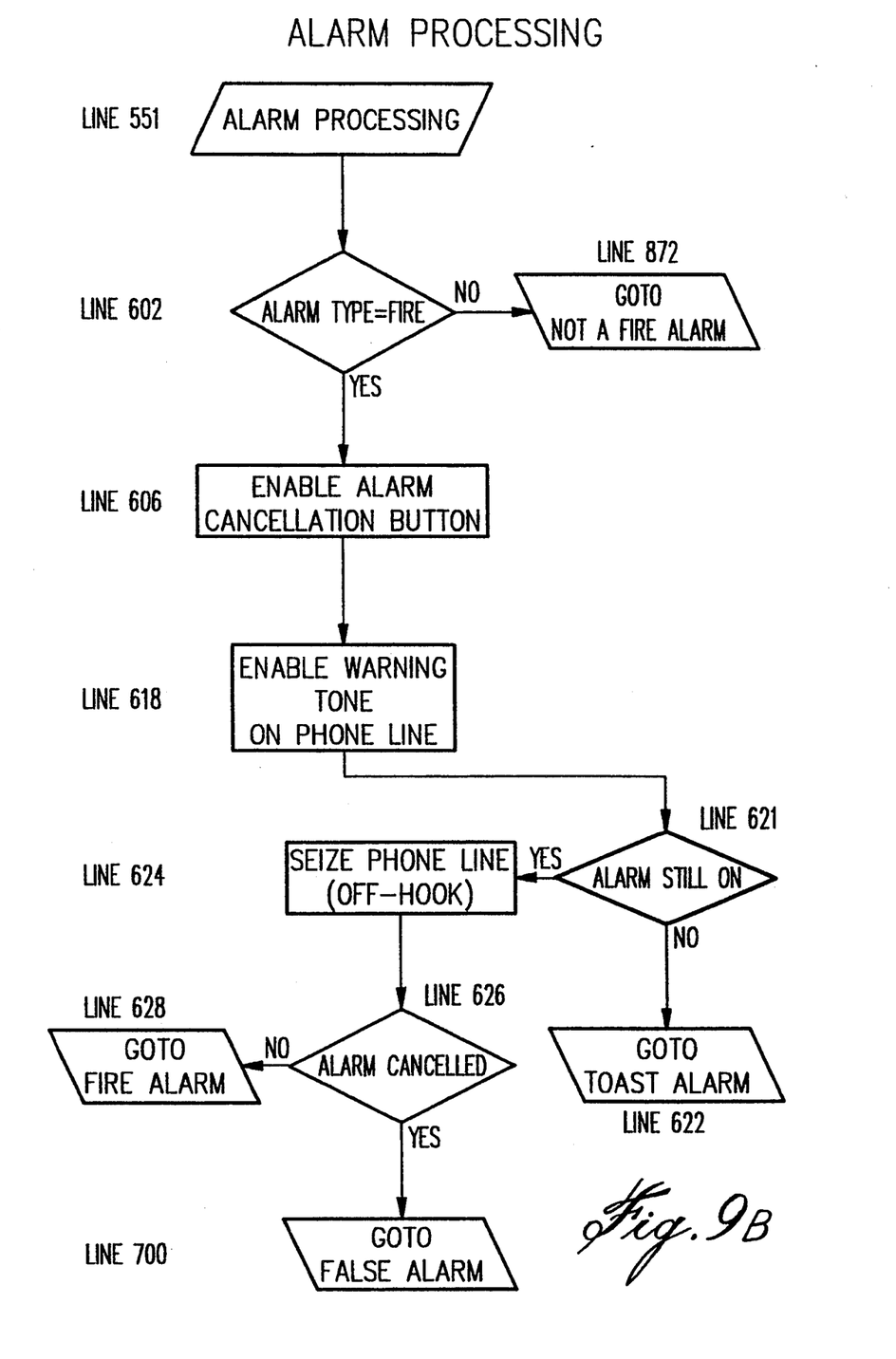

Before turning to FIG. 9B, when an alarm is detected, an interrupt signal will be fed to inputs 0 to 6 of unit 117. A fire alarm will be input to terminal 0.

When unit 117 receives an input on either terminals 0 to 6 or as a result of pressing test button 118, unit 117 will provide an output on its terminals SDA and SCL. At the same time, it will provide a trigger signal to the trigger circuit 123 which will provide an input to inverter 129. Inverter 129 then provides a signal to transistor 131 which will turn off the power shut-down system 133 so that power is turned on.

To turn off the power, a shut-down signal is provided to one input of gate 125 which resets the trigger circuit 123. A signal is then provided to gate 129 which again provides an output to transistor 131 to turn on the power shut-down system so that the power is turned off.

When the power is turned on, the first instruction of processor 34 is to check what type of an alarm has turned the system on. This is determined in unit 117 and the nature of the alarm is communicated through the terminals SDA and SCL of unit 117 to the processor 34 as well as to the tone generator 43. The processor 34 and tone generator 43 are fed from unit 117 through SDA and SCL busses. Transistors 119 and 121 are in the SDA and SCL busses respectively and, as above-mentioned, are to isolate the SDA and SCL terminals of unit 117.

Turning now to FIG. 9B, it is first determined whether the alarm type is a fire alarm. Assuming that the alarm detected is a fire alarm, the alarm cancellation button is first reset to 0 in an appropriate memory space in the processor 34. Throughout the procedure, the number in this memory space is checked to determine whether it is greater than 0.

After the alarm cancellation button has been enabled, a signal is sent to the tone generator 113 through the SDA and SCL busses, and the tone generator 113 is enabled to generate a warning tone. If there is someone on the telephone line which is to be used to communicate with a monitoring station, then that person, on hearing the warning tone, should hang up. The tone which is generated in the generator 113 is amplified in the modem 111 and is transmitted through the transformer 115 onto the telephone lines as will be discussed below.

After the tone generator. 113 has been enabled, the system checks once again to determine if the alarm is still on at line 621. This is checked by determining whether the interrupt is still at the terminal 0 on unit 117. Assuming that it is, the phone line is seized.

Turning to FIG. 7, the phone line is seized by activating coils 105C and 107C to connect the telephone line to the secondary of the transformer 115. In this regard, it is pointed out that coils 109 will activate contact 109B to assume one of two positions. It is used on contact to activate an external alarm device.

When the telephone line has been seized, the system is checked to determine if the alarm has been cancelled, that is, if the alarm cancellation button has been pushed. If it has not been pushed, then the program is continued at the fire alarm flow chart in FIG. 9C.

Figure 9C:
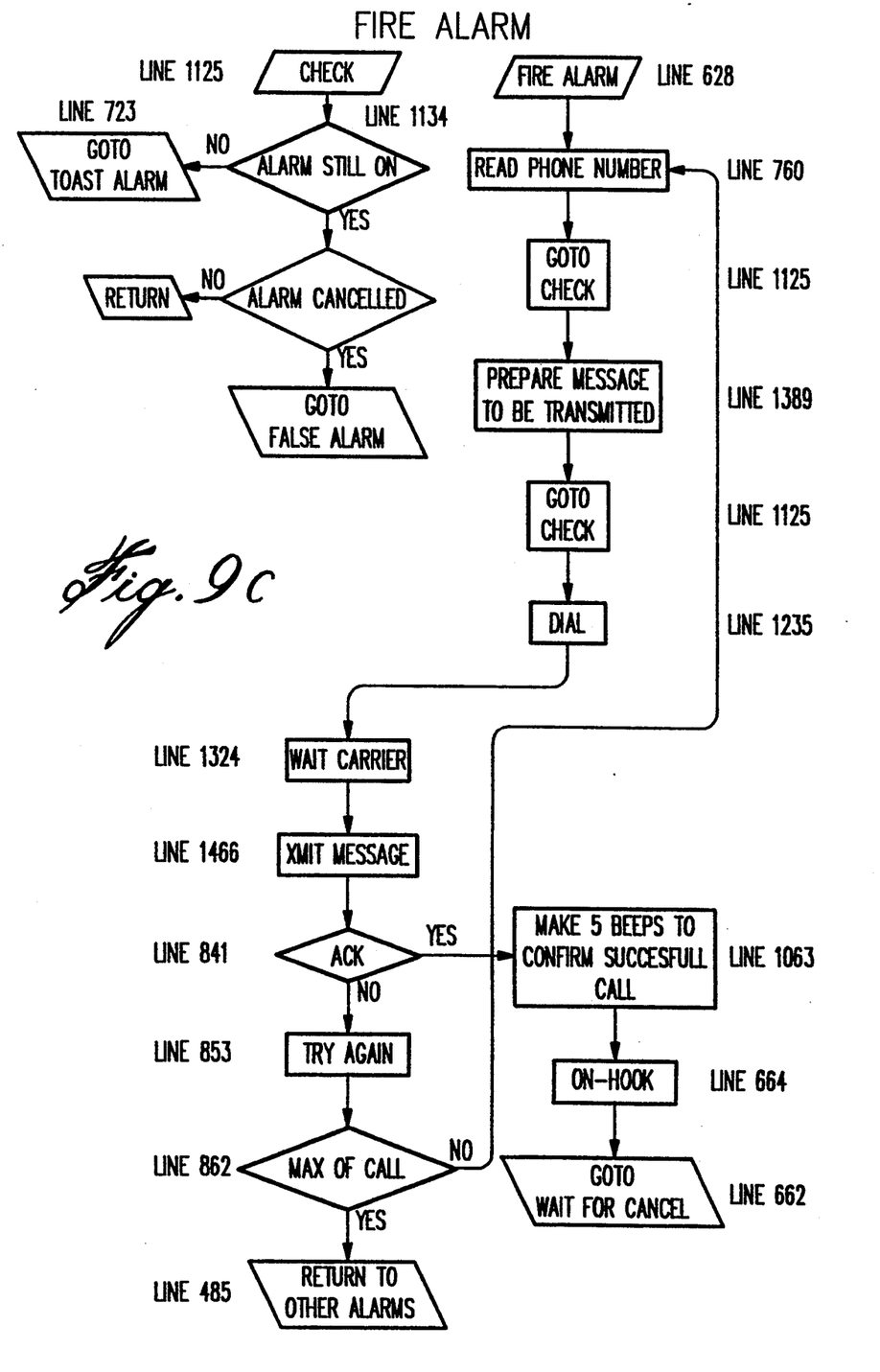

Turning to FIG. 9C, it is noted that the procedures can be ended by the GO TO TOAST alarm at line 622 or the GO TO FALSE ALARM at line 700. Both of these flow charts are in FIG. 9B. As can be seen, the false alarm and toast alarm result in placing the telephone back on-hook (returning the telephone line to telephone users) and then waiting a predetermined time before returning to the other alarms box in FIG. 9A. It will be noted that, at all times, the GO TO TOAST alarm results from determining that the interrupt is no longer on an input terminal of unit 117. The GO TO FALSE alarm results from pressing the alarm cancellation button.

Turning now to FIG. 9C, it can be seen that there is a check procedure involved at several stages in this flow chart. The check procedure first determines if the interrupt is still on terminal 0 of unit 117. If the interrupt is still there, then the system checks to determine if the cancellation button has been pushed by checking the space in memory to determine if the number in there is greater than 0. If it is not greater than 0, then the alarm cancellation button has not been pushed and the program returns to the next procedure in the false alarm flow.

The first step of the false alarm flow is to read the appropriate phone number. In the fire alarm case, the phone number would be the phone of a fire station.

The alarm condition is then checked and, if there is no GO TO TOAST alarm or GO TO FALSE alarm instruction, a message is prepared for transmission. The message will depend on the type of alarms which have been activated. For example, if there is a fire alarm and an emergency alarm activated at the same time, then the first alarm would only be transmitted to the fire station and the emergency alarm would be transmitted to a different monitoring station so that part of the alarms would be masked when sent to one place but not masked when sent to another.

After the message has been prepared, a further check is carried out. The telephone number that was read is then dialled. In the case of a dial tone, the appropriate tones are generated in the tone generator 113, amplified in modem 111 and sent out over the telephone lines through the transformer 115. In the case of a pulse code telephone number, the relay 109 is pulsed in accordance with the appropriate telephone code. The relay 107, under these conditions, is driven by the processor 34.

The system then waits for a carrier, i.e., it waits to determine if a connection has been made. When it detects that a connection has been made, it transmits the message.

The system, at line 841, then waits to determine if the message has been acknowledged. If the message has been acknowledged, the circuit illustrated in FIG. 8 generates 5 beeps to confirm a successful call. The telephone lines are then returned to the user and the program continues in the WAIT FOR CANCEL flow chart of FIG. 9D.

Figure 9D:
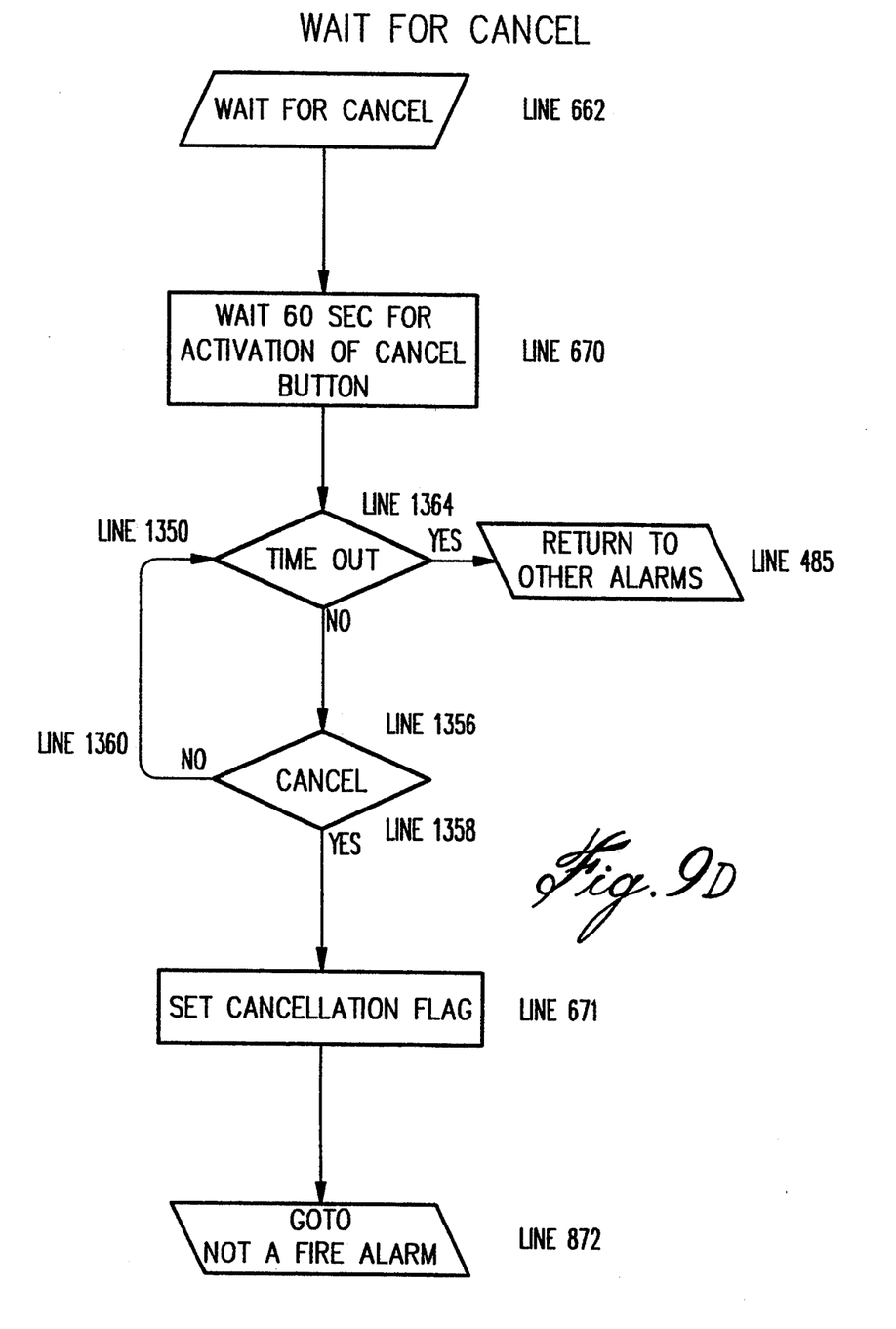

The purpose of the WAIT FOR CANCEL procedure is, if within 60 seconds of acknowledgement, it is determined that the alarm is not really a true alarm, then the alarm can still be cancelled by pressing the alarm cancellation button. In the latter event, the cancellation flag will be set and the program will turn to the NOT A FIRE ALARM flow chart in FIG. 9E. If the 60 seconds passes and the fire alarm is not cancelled, then the program is returned to the other alarms procedure of FIG. 9A.

Returning to FIG. 9C, if an acknowledgement is not received within a certain predetermined period of time, then the try again procedure is initiated. In the try again procedure, the telephone number is once again dialled, a connection is verified and the message is transmitted.

The try again procedure will be carried out only for a maximum number of times, and if acknowledgement is not received after the maximum number of times, then the program is returned to the other alarms procedure of the flow chart in FIG. 9A.

It is pointed out at this time that the reason for the large number of checks as to the status of the alarm condition is that all care must be taken to avoid calling, for example, the police or the fire department for a false alarm. Police and fire departments tend to issue fines for initiating such false alarms so that various checks are made to ensure that false alarms do not get sent out to the police department or the fire department or other monitoring stations which will provide punitive measures for issuance of such false alarms.

Figure 9E:
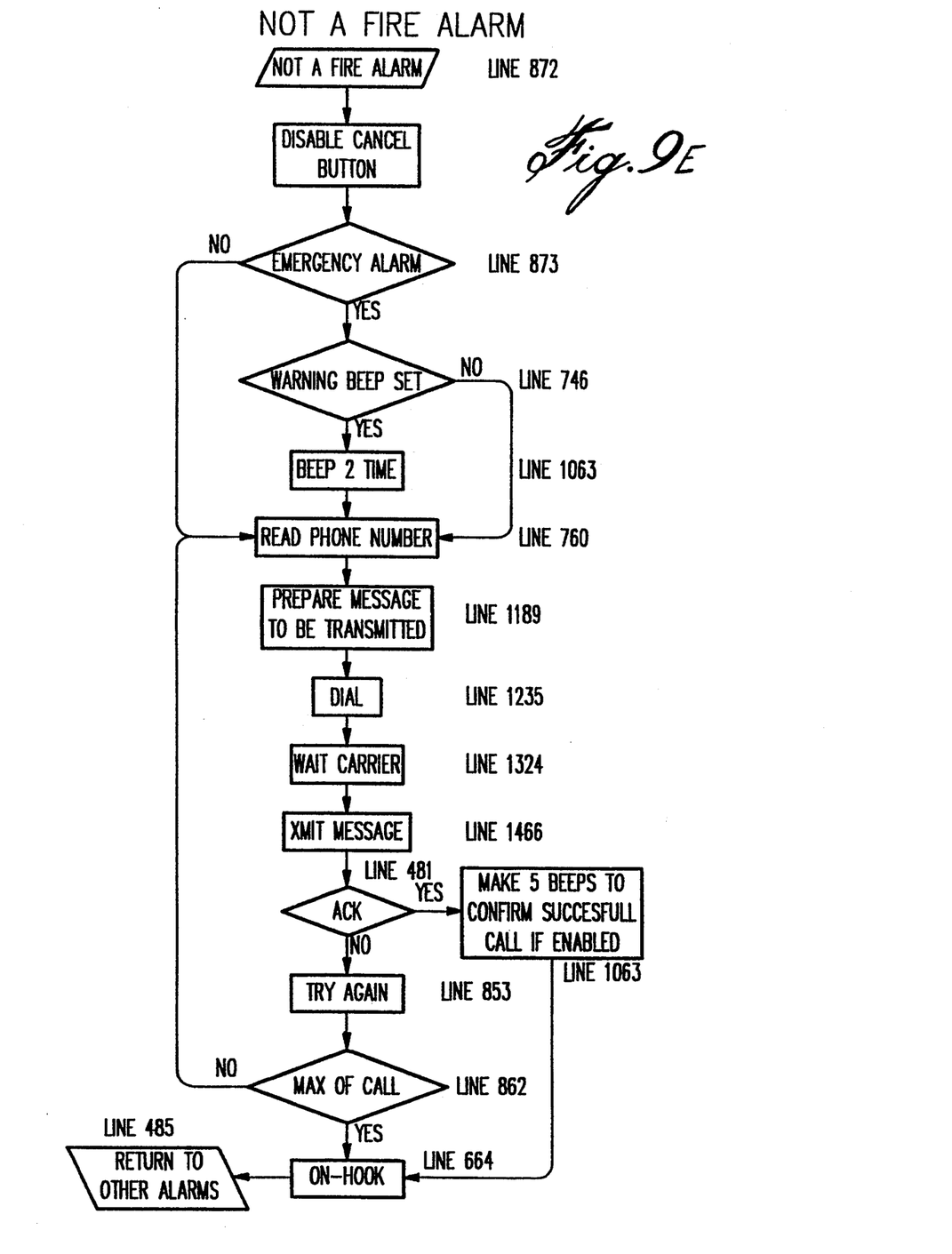
Figure 9F:
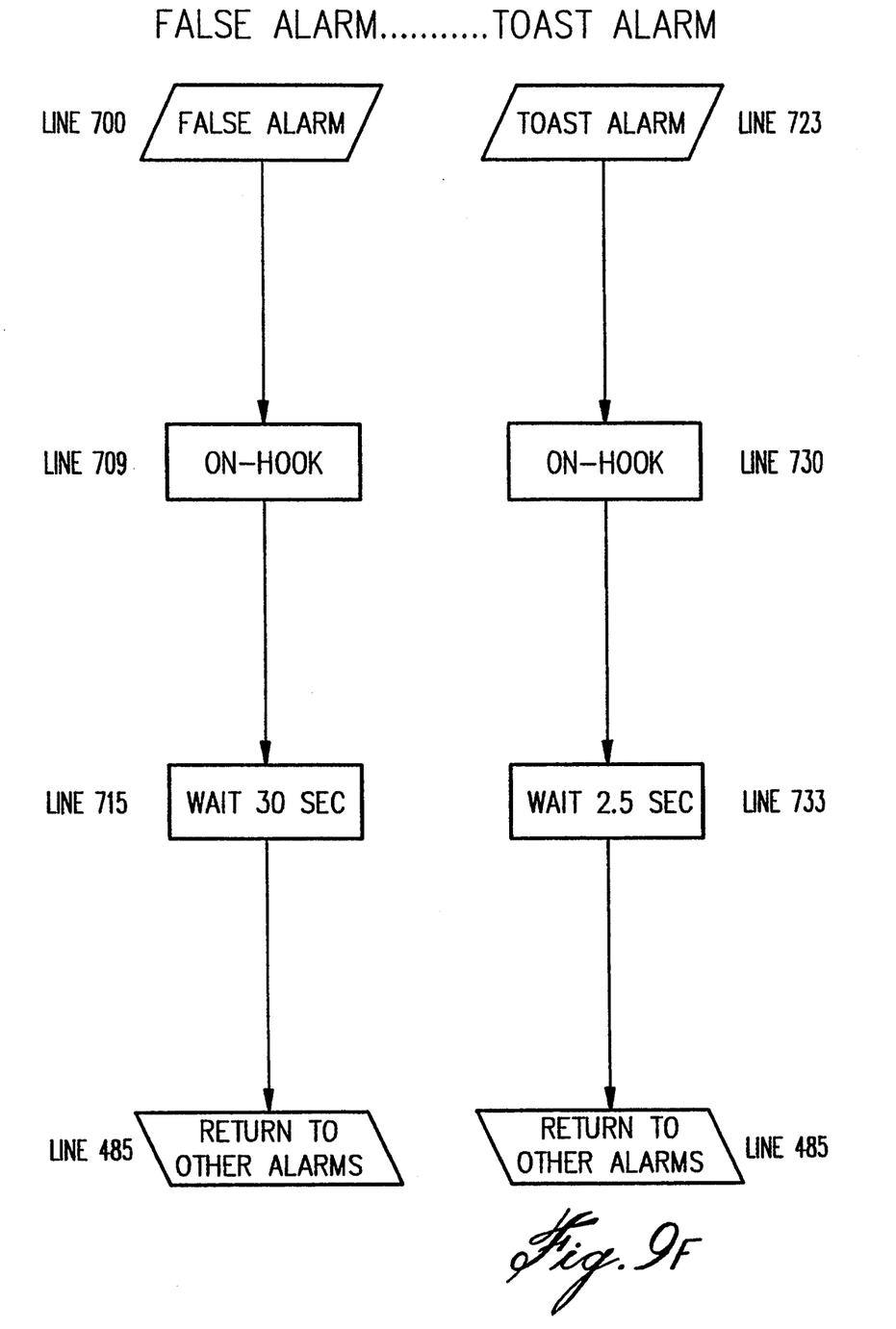

As above discussed, one of the options out of the way for cancel flow chart in FIG. 9D is to enter the not a fire alarm flow chart in FIG. 9E. Turning now to FIG. 9E, the first procedure in this flow chart is to disable the alarm cancel button. With the alarm cancel button disabled, this button is no longer in the cancellation state.

The program then checks to determine if the system is in an emergency alarm. If it is, then a warning beep is set on the circuit in FIG. 8. To signal an emergency alarm, the circuit beeps only twice.

The read phone number procedure at line 760 reads a phone number determined by the way in which this procedure is entered. If it is determined that the alarm is not an emergency alarm, then the phone number of the appropriate monitoring station will be read.

A message to be transmitted is then prepared, the number is dialled, a connection is awaited, and the message is then transmitted. Once again, an acknowledgement is awaited and, when acknowledgement is received, 5 beeps are sounded and the telephone is returned to the telephone user. If acknowledgement is not received, then the dial procedure is carried out again for a maximum number of times. If acknowledgement is not received after the maximum number of calls, then the telephone is in any case returned to the user. In both cases, the program then returns to the other alarms procedure of the flow chart in FIG. 9A.

Although a particular embodiment has been described, this was for the purpose of illustrating, but not limiting, the invention. Various modifications, which will come readily to the mind of one skilled in the art, are within the scope of the invention as defined in the appended claims.

I claim:

1. A system for detecting one or more of a plurality of alarm conditions, at a monitored location, by respective alarm detectors, and for reporting the detected alarm conditions to one or more respective monitoring stations, comprising:

telephone line means for effecting communications between said monitored location and one or more of said monitoring stations;

an alarm sensor having a plurality of inputs, said alarm detectors being connected to respective ones of said inputs of said alarm sensor;

said alarm sensor including a data output terminal (SDA) and a clock output terminal (SCL);

a modem having a plurality of input terminals and a plurality of output terminals;

a microprocessor having a plurality of input terminals and a plurality of output terminals;

a battery;

power shut-down means connected between said battery and said modem and said microprocessor, said power shut-down means being normally turned on whereby power from said battery is not supplied to said modem and to said microprocessor;

trigger circuit means connected between said sensor and said power shut-down means;

said trigger circuit means being activated by said alarm sensor on receipt of an alarm condition signal whereby to turn off said power shut-down means;

whereby, power is supplied to said modem and to said microprocessor on receipt of an alarm condition by said alarm sensor;

means for seizing said telephone line means on receipt of an alarm condition by said alarm sensor.

2. A system as defined in claim 1 wherein said trigger circuit comprises a circuit arrangement of gate means.

3. A system as defined in claim 2 wherein said microprocessor has an input clock terminal and an input data terminal;

and wherein said modem has an input clock terminal and an input data terminal;

said data output terminal of said alarm sensor being connected to said input data terminal of said microprocessor and said modem;

said clock output terminal of said alarm sensor being connected to the input clock terminal of said microprocessor and said modem;

whereby alarm conditions sensed by said alarm sensor are communicated to said microprocessor and to said modem.

4. A system as defined in claim 3 and including a tone generator having a data input terminal and a clock input terminal;

the data input terminal of said tone generator being connected to the clock output terminal of said alarm sensor and said clock input terminal of said tone generator being connected to the clock output terminal of said alarm sensor;

whereby to communicate an alarm condition sensed by said alarm sensor to said tone generator to initiate generation of appropriate tones.

5. A system as defined in claim 4 wherein said tone generator generates telephone dialing tones.

6. A system as defined in claim 5 and including a transformer having a primary winding and a secondary winding;

said primary winding of said transformer being connected to said modem;

said secondary winding of said transformer being connected to said telephone line means through relay contacts;

said tones generated by said tone generator being transmitted, through said modem, to said primary winding of said transformer;

said relay contacts being activated by output terminals of said microprocessor when an alarm condition is reported by said alarm sensor to said microprocessor;

whereby, a respective telephone number to a respective monitoring station is dialed on said telephone line upon receipt of a respective alarm condition.

* * * * *